Sept. 30, 1947.   G. B. FINNEGAN, JR., ET AL   2,428,273
RECORDING CAMERA
Original Filed Jan. 29, 1940    7 Sheets-Sheet 1

Fig. 1

INVENTORS
G. B. Finnegan Jr. and N. A. Durham
BY
Wagan Finnegan & Durham
ATTORNEYS

Fig. 2

Sept. 30, 1947. G. B. FINNEGAN, JR., ET AL 2,428,273
RECORDING CAMERA
Original Filed Jan. 29, 1940 7 Sheets-Sheet 4

Patented Sept. 30, 1947

2,428,273

UNITED STATES PATENT OFFICE 2,428,273

RECORDING CAMERA

George B. Finnegan, Jr., Mountain Lakes, N. J., and Hobart N. Durham, Munsey Park, N. Y.

Original application January 29, 1940, Serial No. 316,080, now Patent No. 2,336,076, dated December 7, 1943. Divided and this application November 2, 1943, Serial No. 508,674

4 Claims. (Cl. 88—16)

1

The present invention relates to new and useful improvements in recording the operation of motor vehicles and more particularly to improved photographic apparatus for making an automatic record of the course and manner of operation of the vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

This application is a division of our copending application Serial No. 316,080, filed January 29, 1940, now Patent No. 2,336,076 dated December 7, 1943.

The present invention has for its object the provision of a novel and improved camera for

2 automatically producing a continuous photographic record showing the course and manner of operation of a motor vehicle. The invention also has for its object the provision of an improved camera which will provide a photographic record of the improper operation of a motor vehicle so that such records may be used for the correction and disciplining of their drivers as well as provide a record which will furnish pictorial evidence as to the traffic conditions at the time of an accident in which the motor vehicle is involved together with comprehensive data as to the manner in which the vehicle was operated at the time of the accident.

The invention further provides an automatically operated camera which produces a series of periodic photographs, at a minimum of expense, showing the continuous course of the vehicle together with detailed operating data related to each picture enabling the determination of responsibility in the case of accident as well as providing data for the improvement of the operation of the vehicle not only in the driving habits of the driver but also in routing and scheduling of the vehicles.

In accordance with the illustrative embodiment of the invention, a motor vehicle is provided with a camera operating on relatively narrow strip film, such as 8 mm. motion picture film, and provided with a lens of relatively short focal length so as to include in each picture a maximum angle of view, as well as to insure not only that all of the road and scene within the angle of view are in focus, but also to permit instruments controlled by the operation of the vehicle to be contained within the camera casing and be substantially within the depth of focus of the camera lens.

The camera is preferably mounted at a considerable distance above the road, near the front and upper portion of the vehicle and is directed forwardly of the vehicle so as to show the approaching traffic and the roadway to be travelled. Means are provided for automatically taking successive photographs and for this purpose the film is exposed and advanced normally each time the vehicle has travelled a predetermined distance, say 500 feet, but it is also exposed and advanced at more frequent intervals when the conditions require that photographs be taken more frequently to record all of the conditions of operation; thus, when the vehicle is being steered around a substantial curve, the pictures are taken as often as every 50 feet, and similar pictures are taken every 50 feet while the vehicle is being braked to slow it or bring it to a stop, and additional photographs are produced on the record film at the moment when the brake is first applied or whenever the vehicle is decelerated by braking or otherwise in excess of a predetermined rate.

Thus, the series of pictures will show the normal operation of the vehicle, the pictures taken while the vehicle is being steered will show overlapping portions of the roadway, the picture taken when the brake was initially applied will show the conditions ahead which required the application of the brake, the emergency of deceleration controlled picture will likewise show whether the excessive deceleration was caused by braking or a collision, and the series of pictures during braking will show a succession of road scenes from which it can be accurately determined whether the operator applied the brake sufficiently early to have been prudent in the case of an accident as well as to show whether the avoidance of an accident was due to his skill and judgment or was due to other causes.

Included in, and forming an integral part of each of the record pictures is a record of operating data such as vehicle speed, time, whether or not the vehicle was braked, whether the clutch was disengaged as in coasting, as well as any other desired factors which are of importance in connection with the proper operation of the vehicle.

Preferably, the camera is provided with a removable magazine which contains a substantial supply of film so that the film need not be replenished over a long period of time, such as a week's normal operation, and the magazines are preferably removable from the camera without film wastage or destruction of the previously made record thereby enabling each operator of the vehicle to have his own magazine so that he may be fairly charged with personal responsibility for the record of his own operations.

Provision is also made for protecting the camera against weather and dirt so that it may continue in operation without excessive attention over long periods of time and under all conditions of operation. The camera is preferably electrically controlled and powered, is difficult to tamper with so as to produce an inaccurate or unduly favorable record.

It will be understood that the foregoing general description, and the following detailed description as well, are exemplary and explanatory of the invention, but are not restrictive thereof.

Figure 1:
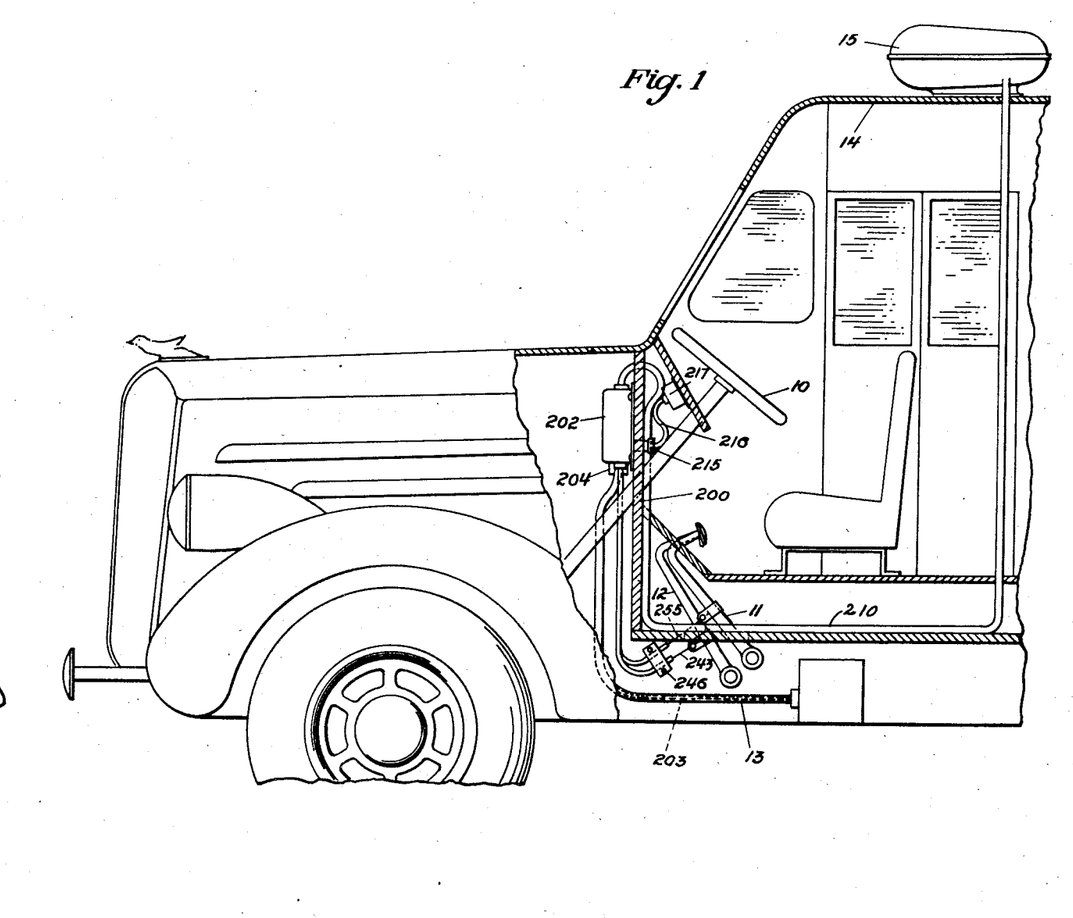
Fig. 1 is a fragmentary side elevation, partially in section, showing a typical and illustrative embodiment of the present invention.

Referring now in detail to the accompanying drawings which show a typical and illustrative embodiment of the present invention, the recording camera is shown as mounted on the upper portion of a conventional motor vehicle, and the control assembly is mounted on the dash panel of the vehicle. The motor vehicle is provided with the usual steering wheel 10, brake pedal 11, clutch pedal 12, speedometer drive shaft 13, while above the operator, and preferably on the roof 14 of the vehicle, is mounted the recording camera 15.

Figs. 2 to 6 illustrate in detail the construction of the embodied form of recording camera. The camera is contained within a casing 20 which is preferably of rounded shape and may be suitably streamlined to reduce its air resistance. The shutter and film feeding portions of the camera are preferably located near the central portion of the casing, the motor driving mechanism and the data indicating instruments are preferably located in the rear portion of the casing and the forward portion of the casing serves as a light trap, weather protecting means and as a support for the mirror for reflecting the instrument data into the camera lens and onto the photographic film.

Figure 2:
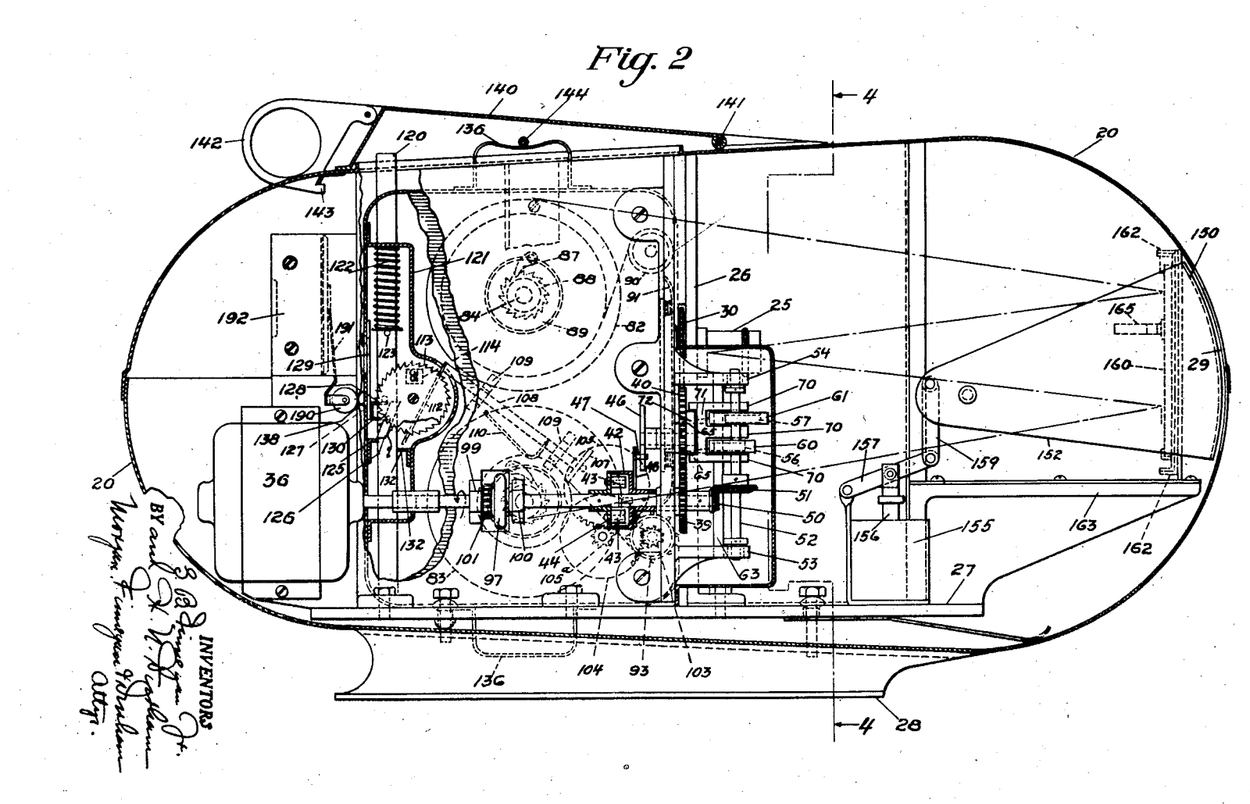
Fig. 2 is a detailed vertical section through a camera in accordance with the present invention with the electrical wiring omitted.

The camera lens 25 is mounted on a substantially horizontal axis and is preferably of short focal length, from 10 to 15 mm., and is threadedly secured into the lens opening at the front of the casting 26 which is bolted to the base plate 27, which in turn is bolted to the base 28 of the casing. The forward end of the casing is provided with a rectangular opening 29 of sufficient size and so positioned not to interfere with the image of the roadway as formed by the lens.

Figure 3:
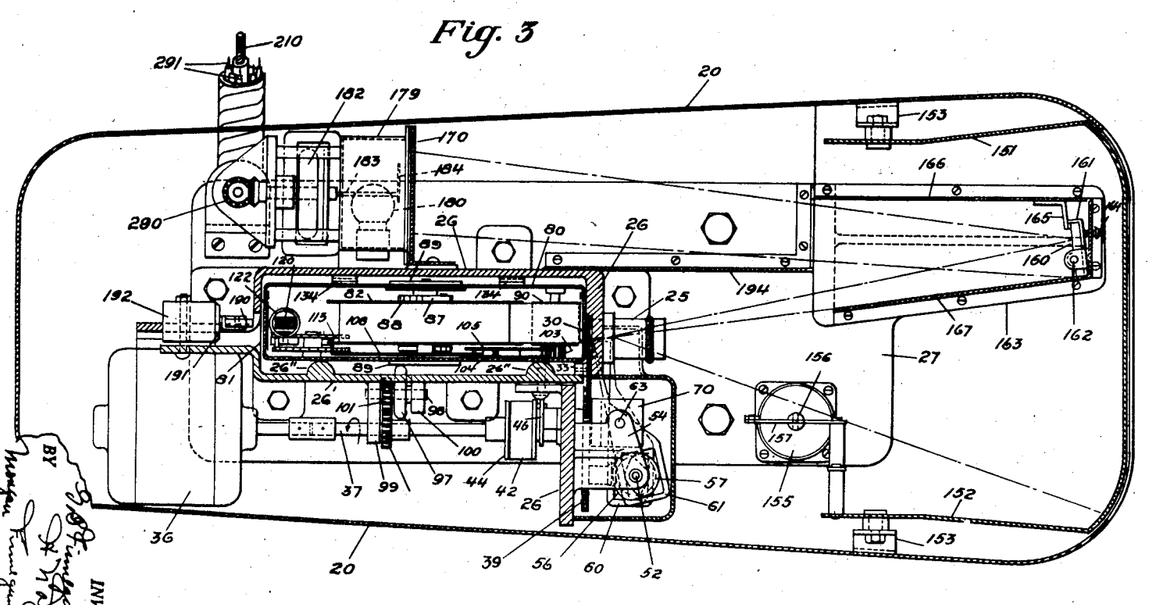
Fig. 3 is a detailed horizontal section of the camera shown in Fig. 2.

Immediately behind the lens 25 is a rotary shutter 30 having a cutaway segmental area 32 through which the exposure is made, and this shutter is rotatably mounted on a stud 33 projecting from the casting 26. The periphery of shutter 30 is formed as a spur gear through which the shutter is rotatably driven from motor 36 at the rear of the camera. Motor 36 is provided with a shaft extension 37 journalled in casting 26 and rotates pinion 38 meshing with idler 39 which in turn drives idler 40 meshing with the gear face on shutter 30.

For permitting the shutter to be rotated only a single revolution at a time, a drum 42 is loosely mounted on shaft 37, and the interior of this drum is adapted to be engaged by the centrifugally expanded weights 43 which are pivotally mounted on flange 44 also carried on shaft 37 and rotated thereby. Idler 40 is fixed to a snail cam 46 which rotates therewith and the radial portion of this cam is adapted to engage a detent pin 47 carried by arm 48 fixed to drum 42. As the shaft 37 rotates, arm 48 and pin 47 are lifted into contact with the periphery of cam 46 ready to engage the radial portion of this cam to hold the gear 40, shutter 30, and shaft 37 against further revolution until the motor current shall have been interrupted. When the motor current is interrupted, the torque on shaft 37 is relieved and arm 48 falls by gravity, retracting the pin 47 from engagement with the cam 46, so as to condition the parts for another full shutter revolution when the motor is next energized.

Means are provided for feeding the film after each exposure and during the non-exposure portion of each shutter revolution, and where 16 mm. film is employed and the exposures are to be only half the width of the film, as in the illustrative embodiment, means are provided for feeding the film only one half the distance between adjacent perforations after each exposure. Fixed to rotate with gear 39 is a bevelled pinion 50 meshing with a bevel gear 51 on shaft 52 which is rotatably journalled in the brackets 53 and 54 extending forwardly from the casting 26. Shaft 52 carries two similar cams 56 and 57 which are spaced slightly apart and are 180 degrees out of phase with each other. Feed fingers 60 and 61 are pivotally mounted on vertical shaft 63 carried in brackets 53, 54 and at one end each of the feed fingers 60 and 61 is formed with a tapered pin 65 which is adapted to engage in the usual film perforation. The other ends of the feed fingers 60 and 61 are provided with box-like portions 66 surrounding the cams 56 and 57 so that the fingers are oscillated by rotation of the cams.

Means are provided for moving the feed fingers 60 and 61 up and down on their shaft 63, the idle upward motion of the fingers taking place while the fingers are disengaged from the film, while the downward motion of the fingers occurs when one or the other of them is alternately engaged with a perforation. For this purpose, a guide is mounted for vertical movement on shaft 63 and comprises three forwardly extending plates 70 in superposed relation with the fingers 60 and 61 between them, these plates being interconnected by the web 71, and the upper and lower plates extending rearwardly to engage the upper and lower portions of cam 72 mounted on the forward space of idler gear 40. Cam 72 as it rotates produces a gradual starting and stopping of the film approximating simple harmonic motion, and the plates 70 are apertured to fit over and be guided by the shaft 63.

Gear 50 is preferably rotated to make one and one half revolution for every revolution of cam 72 so that on feeding motions the fingers 60 and 61 are alternately engaged, and there is no rubbing of either of the fingers on the sensitized surface of the film during the non-feeding movement.

Motor 36 is preferably of sufficient power to produce a rapid acceleration of the shaft 37, and this speed and the angular opening of the shutter area 32 are such as to produce the desired length of exposure, say one twenty-fifth or one-thirtieth of a second.

Figures 5, 6:
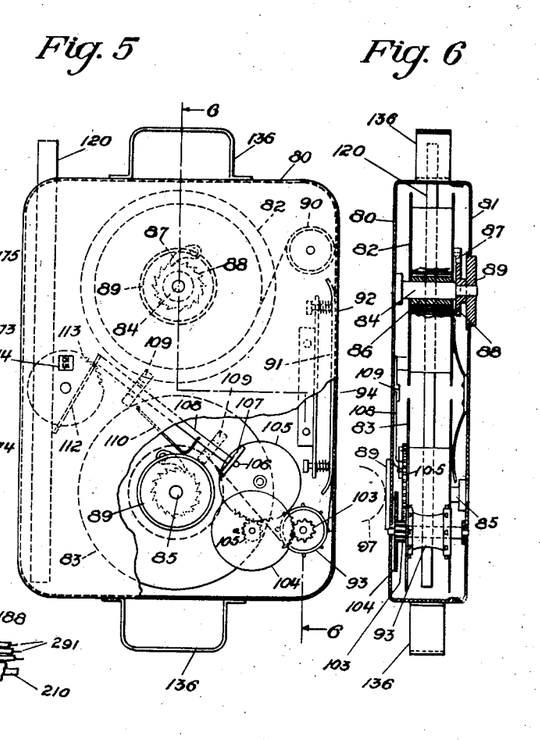
Fig. 5 is a side elevation of a film magazine for use in the camera of Figs. 2 to 4.
Fig. 6 is a sectional view taken on the line 6—6 of Fig. 5.

A film magazine is provided for holding the film supply and is shown in detail in Figures 5 and 6. As embodied, this comprises a metal box 80 having a removable side 81. Within the box are a pair of film spools 82 and 83 adapted to hold a relatively long strip of photographic film, such as 16 mm. motion picture film. The spools 82 and 83 are mounted on studs 84 and 85, one of which is riveted to the case 80, while the other stud 85 is riveted to the cover 81. At the center of spool 82 is a hub portion 86 leaving the spool free to rotate on the stud 84. On one side of spool 82 is a spring-pressed pawl 87 engageable with the teeth of ratchet 88 which is formed integral with a friction disc 89 mounted on the reduced end of stud 84 and rotatably projecting through an aperture in the cover plate 81. Similarly, spool 83 is mounted on its stud 85 and the friction disc 89 projects through the magazine wall 80 so that the disc and spool may be rotated. The film is threaded from spool 82 over an idler roll 90 which is freely rotatable and contained within the casing 80, and passes between a spring-pressed pressure plate 91 and the forward wall 92 of the casing, thence over sprocket 93 and on to spool 83. The front wall 92 of the casing 80 is formed with a suitable aperture 94 through which the exposure is made, this aperture registering with an opening and casting 26 immediately behind the lens, and also with the shutter opening 32.

For rotating the take-up spool 83 as the film is fed downwardly past exposure position by the fingers 60 and 61, a friction driving wheel 97 is rotatably mounted on shaft 98 journalled in brackets 99 and 100, and is driven through pinions 101 from the shaft 37, wheel 97 contacting lightly with the friction disc 89 so as to take up the slack in the film below the pressure plate 91, as well as to rotate the sprocket wheel 93 as its teeth are engaged by the perforations in the film. Sprocket wheel 93 is connected to pinion 103 meshing with idler 104 to drive gear 105 through pinion 105a fast to gear 104, and on the face of gear 105 is mounted an eccentrically located pin 106 from which the footage indicator is actuated. Pin 106 engages with the T-head 107 on slide rod 108, which is slidable in guides 109, against the pressure of spring 110, all of these parts, as well as the gears 103, 104 and 105 being preferably located within the magazine and to one side of the film spool 83. At the other end of rod 108 is fixed a double pawl 112 engageable with either side and a footage indicating ratchet wheel 113 rotatably mounted within the magazine casing, and graduated footage indications which are visible through an aperture 114 in the side wall of the casing 80. The pawl portions of the double pawl 112 are preferably spaced further apart than the chord across ratchet 113, and rod 108 has considerable lateral play in the guides 109 so that the upper pawl alone is engaged in the position shown in Fig. 5. As film is fed past the exposure aperture 94, sprocket 93 is rotated to actuate pawl 112 and thereby advance the ratchet wheel footage indicator 113.

Preferably, the magazine is adapted to contain film which is double width, and means are provided for positively indicating on the magazine when one half width of the film has been exposed, and for preventing incorrect insertion of the magazine within the camera. For this purpose, a slide bar 120 is mounted within the rear portion of the magazine casing 80, and is also slidable within the internal housing 121 within the magazine. Bar 120 is preferably longer than the magazine so that it may project above the top of the magazine, and bar 120 is continuously urged downwardly by a spring 122 encircling the bar and compressed between pin 123 and the internal housing 121. Bar 120 is held in the position shown in Fig. 2 until the film in the magazine has been practically exhausted on the first half of this exposure, and means are provided for then releasing the bar and allowing spring 122 to move the bar downwardly as soon as the magazine has been removed from the camera after exhaustion of the film.

On the rear wall of the magazine casing 80 is a detent 125 projecting alongside of the bar 120 and into the path of a pivoted latch 126 on bar 120 normally held in the position shown by means of a light spring. A pin 127 on ratchet wheel 113 engages with an extension 128 on a slide 129 on the inner rear wall of the casing 80, and another extension 130 engages with the lower half of the pivoted detent 126 so that as the last two or three feet of film are being used, the extensions 128 and 130 are moved downwardly to release the detent 126 from the stop 125, thereby freeing spring 122 to permit movement of rod 120. Thereafter, and upon the movement of the magazine from the camera casing, the bar 120 is projected through the lower wall of the magazine 80, and the upper end of detent 126 engages with the stop 132 mounted on the inner housing 121 to prevent reverse movement of the bar 120.

A magazine receiving chamber is provided within the camera so as to accurately locate the magazine with its aperture 94 in registering position with the lens, and with the other parts in operative relation. For this purpose, casting 26 extends rearwardly along one side of the magazine, and together with the casting 26' forming the other side, provides a narrow cavity into which the magazine may be inserted. Vertically extending bosses 26" projecting inwardly from the wall casting 26' cooperate with springs 134 to locate the magazine laterally of its cavity while another spring is provided at the rear of the magazine to insure proper seating of the forward portion of the magazine against the exposure gate. On the upper and lower portions of the magazine are provided resilient handles 136, the upper one of which may be deformed for accurate vertical positioning of the magazine in the cavity.

After the entire length of film has been exposed for one half its width, the magazine is removed from the cavity and may be reinserted with its other end down, thereby bringing the other half width of the film into exposure position, and the film is thereafter fed reversely, spool 82 acting as a take-up spool. During this operation, the lower pawl of double pawl 112 falls into engagement with the duplicate reversed ratchet 113 so as to cause the reverse movement of the footage indicator.

Means are provided for covering the opening in the top of the camera casing over the magazine cavity, and for this purpose a cover 140 is hinged at 141 over the cavity, and is provided with a finger loop 142 pivoted to the rear of the cover 140 and provided with a latch 143 which may project into a slot in the casing. Within the cover 140 is a transversely extending pin 144 to engage the upper resilient magazine handle 136.

In order to improve the operation of the camera in all kinds of weather, and to reduce the necessity for frequent cleaning of the lens and other parts, a weather shutter is provided substantially closing the opening 29 at the front of the camera casing. This shutter comprises a parti-cylindrical sheet metal member 150 supported at the forward ends of arms 151 and 152 which are pivotally mounted on brackets 153 on the inside of the forward end of the camera casing, and means are provided for automatically lifting the parti-cylindrical shutter 150 in synchronism with the opening of the shutter 30. These means comprise a solenoid 155 having an armature 156 connected to link 157 pivotally mounted on a support 158 and connected at its other end to a link 159 which is pivotally connected to the rear of one arm 151 so that as solenoid 155 is energized the shutter 150 is lifted and is thereafter allowed to drop by gravity when the solenoid is de-energized.

The data as to the manner of operation of the vehicle, such as time, speed, braking, etc., is preferably recorded on the photographic film in line with the perforations and preferably just to the one side of the exposure area to which the data relates. Thus, along one side edge of each picture is the narrow vertical panel extending from the bottom of the picture up to the edge of the perforation (if that frame is perforated), in which panel is contained the photographic image of the various instruments. Near the front of the camera casing, and to one side of the aperture 29 is mounted a narrow vertically extending flat mirror 160 carried in a metal frame 161 which is pivotally mounted at its upper and lower end by means of pivot bearings 162 supported in a suitable bracket attached to the forwardly extending ledge 163 of the main casting 127. Mirror 160 may be adjusted about its pivot by means of a set screw 164 pressing against the forward side of the metal frame 161 against the tension of leaf spring 165 mounted on a side wall 166. Another side wall 167 extends vertically upward from the ledge 163, and is substantially radial with respect to the optical center of the lens 25, and therefore does not obstruct any substantial part of the field of vision of the lens.

Near the rear portion of the camera, and positioned preferably to one side of the film magazine is a vertically extending panel of instruments and other indicia, the images of which may be reflected by the mirror 160 back into the lens 26 so as to form the focussed image on the edge portion of the film to one side of the road scene image area. By using the mirror in this way, the indicia on the instruments can be brought into relatively sharp focus on the film at the same time as the lens is properly focussed for the road scene, and this is so even when relatively large apertures are employed. The mirror more than doubles the distance within the casing and makes its distance sufficiently large for good focus considering the extremely short focal length of the lens used and its great depth of focus.

Figure 4:
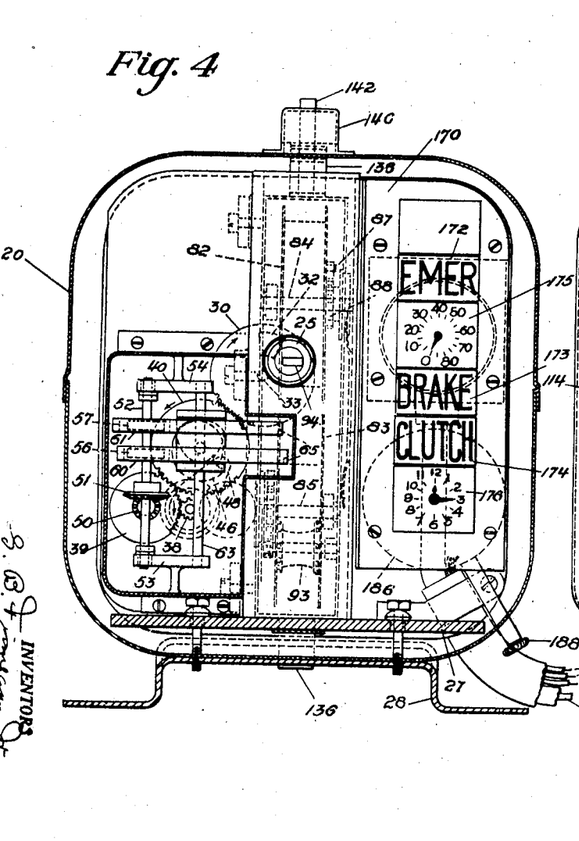
Fig. 4 is a sectional view taken on the line 4—4 of Fig. 2.

While a wide variety of instruments and other indicia may be presented for recording on the record film, Fig. 4 shows these instruments as being a clock and a speedometer, associated with symbols which may be illuminated when the brake is applied, when the clutch is disengaged, and when some other occurrence takes place such as deceleration in excess of a predetermined normal maximum. These instruments are mounted on a bent plate 170 extending vertically and fastened to the outer rear portion of the casting 26 so that the face of the instruments is towards the mirror 160.

Plate 170 is provided with a narrow vertically extending rectangular opening in which is mounted a transparent sheet. Certain areas of the sheet are provided with letters or other symbols such as the abbreviation for emergency in area 172, the work brake in 173, clutch in 174, while the speedometer dial 175 and clock dial 176 are suitably spaced to provide room for their working parts. Behind the plate 170 and in registering relation with the various indicia areas 172 to 176 are a plurality of small light-proof boxes or cells 179, each provided with its own small electric lamp 180 of sufficient intensity to cause an adequate exposure of the indicia images on the photographic film.

The speedometer 182, of conventional construction, is provided with an extended shaft 183 so that the speedometer hand 184 may lie closely against the translucent portion of plate 170 and cast a sharp shadow thereagainst, the translucent surface 170 bearing a speed scale in opaque numerals.

The clock 186 is also mounted behind the panel 170 in a similar manner having its hands closely adjacent to the opaque numerals on the translucent insert 176, and this clock may be provided with a winding stem 188 projecting through the outside of the casing so as to be readily accessible to the driver.

The indicia in panels 172, 173 and 174 are opaque letters on the translucent background which may be illuminated by the individual lamps within the separate light cells, and these indicia are recorded only when the corresponding individual lamps behind them are illuminated.

Inasmuch as the camera is adapted to hold a relatively long strip of film, say 50 or 100 feet, and the film consumption is relatively slow, it is preferable to provide means for interrupting the operation of the camera and for signalling the driver when the film supply is exhausted. For this purpose, slide 129 on the rear of the camera magazine is provided with a rearwardly extending boss 138 which is adapted to contact with the roller 190 on the end of switch operating arm 191 supported on and controlling the operation of switch 192. As slide 129 is moved in one direction or the other by its engagement with pin 127, the boss 138 is moved across roller 190 to interrupt the current supply of the motor 36, and also to energize a warning signal for the driver.

In order to protect the indicia panel 170 against sunlight or light from oncoming headlights such as might otherwise enter through the exposure aperture 29 and cause the indicia in panels 172, 173, 174 to appear as though illuminated, a vertically extending wall 194 projects forwardly from the casting 26 for a considerable distance almost interlying with wall 167, thereby forming a light trap to prevent external light of appreciable intensity shining on the panel 170.

On the inner face of shutter disc 30 and adjacent to an edge of the exposure aperture 94 on the magazine and preferably slightly nearer the perforated edge by which the film is being fed, that is at the extreme left of the aperture looking from the front, is a very small spot of luminous paint which serves as a constant source of weak actinic light and will fog the edge of the film on prolonged exposure. In this way, any prolonged stoppage of the vehicle is indicated by a fogged edge portion 396 of the film, thereby enabling one to see at a glance where the driver stopped and to estimate, by the fog density, the length of the stop. In usual practice, the luminous paint will be such as to produce an appreciable fog in about three or four minutes.

In accordance with the present invention, the road pictures are adapted to be taken periodically at relatively infrequent intervals, say every 500 feet, or ten times per mile of vehicle travel. In addition, a picture is taken whenever various unusual conditions occur, such as when the vehicle is sharply steered, when the brake is applied, and when the deceleration of the vehicle exceeds a predetermined maximum, as in a collision. While the unusual conditions continue, as with a normal or emergency application of the brakes, additional pictures are taken at much more frequent intervals, say every 50 feet or 100 pictures per mile of vehicle travel, and the taking of these more frequent pictures continue until the turning, braking or excessive deceleration has stopped. In addition, means are preferably provided for causing the indicia panel to be properly illuminated a small fraction of a second in advance of the actual exposure so that the filaments of the lamps 305, 335, 321, 333 and 337 illuminating the indicia will be at proper intensity at the time of the exposure.

As shown in Figs. 1 and 7 to 10 of the drawing, the control mechanism is preferably formed as a unit which is detachably connected to some convenient portion of the vehicle such as the front body panel 200. This control unit 202 is adapted to be connected to the conventional speedometer shaft which is driven from the transmission box in the usual way, and this shaft is shown as a flexible shaft 203, which is connected by a suitable fitting 204 to the under side of unit 202. Shaft 203 drives main shaft 205 rotatably mounted within the casing 206 by means of anti-friction bearings 207 and 208, and provided at its upper end with a suitable fitting 209 by which the main shaft 205 may drive flexible shaft 210. Main shaft 205 is also provided with a bevel gear 211 meshing with bevel gear 212 fixed to the end of the speedometer take-off shaft 213 journalled in anti-friction bearings 214 and which may be connected by fitting 215 to the short speedometer shaft 216 for driving the conventional speedometer 217.

Figures 7, 9, 10:
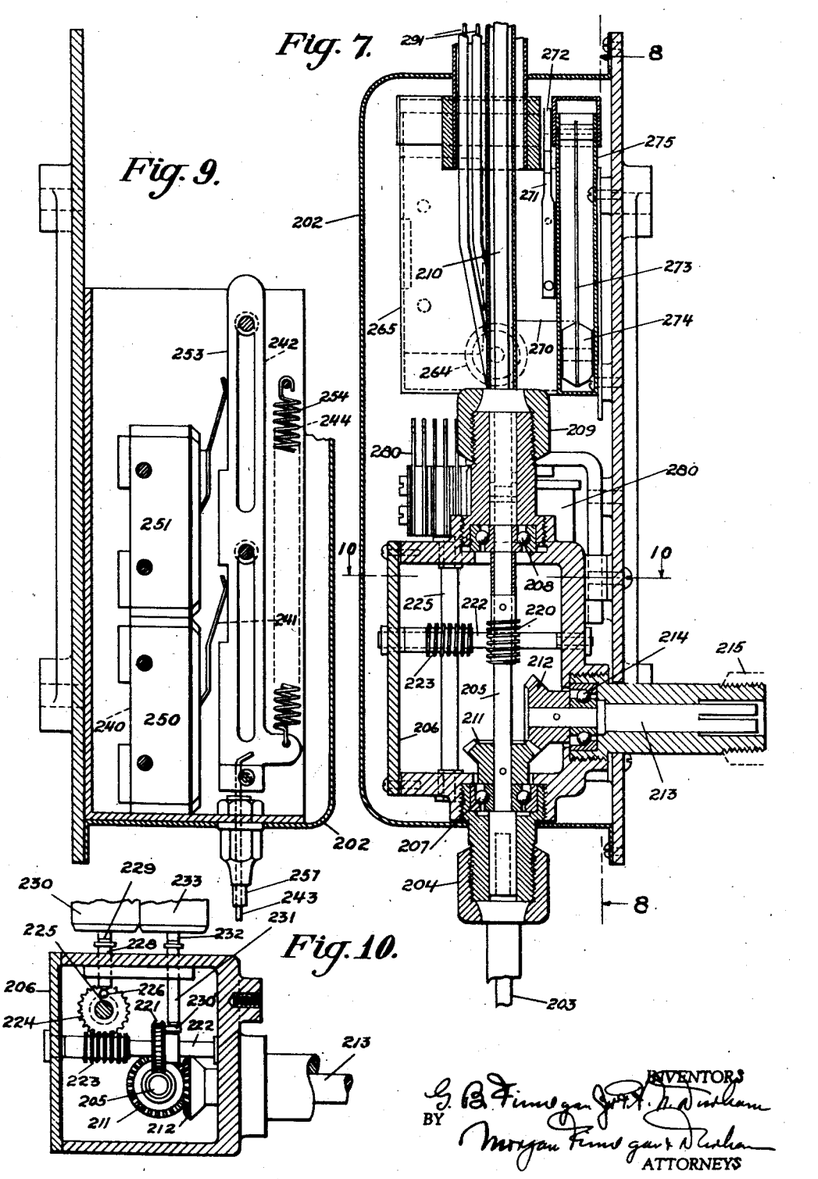
Fig. 7 is a vertical sectional view of the control unit shown in Fig. 1.
Fig. 9 is a sectional view taken on the line 9—9 of Fig. 8.
Fig. 10 is a fragmentary sectional view taken on the line 10—10 of Fig. 7.
Figure 8:
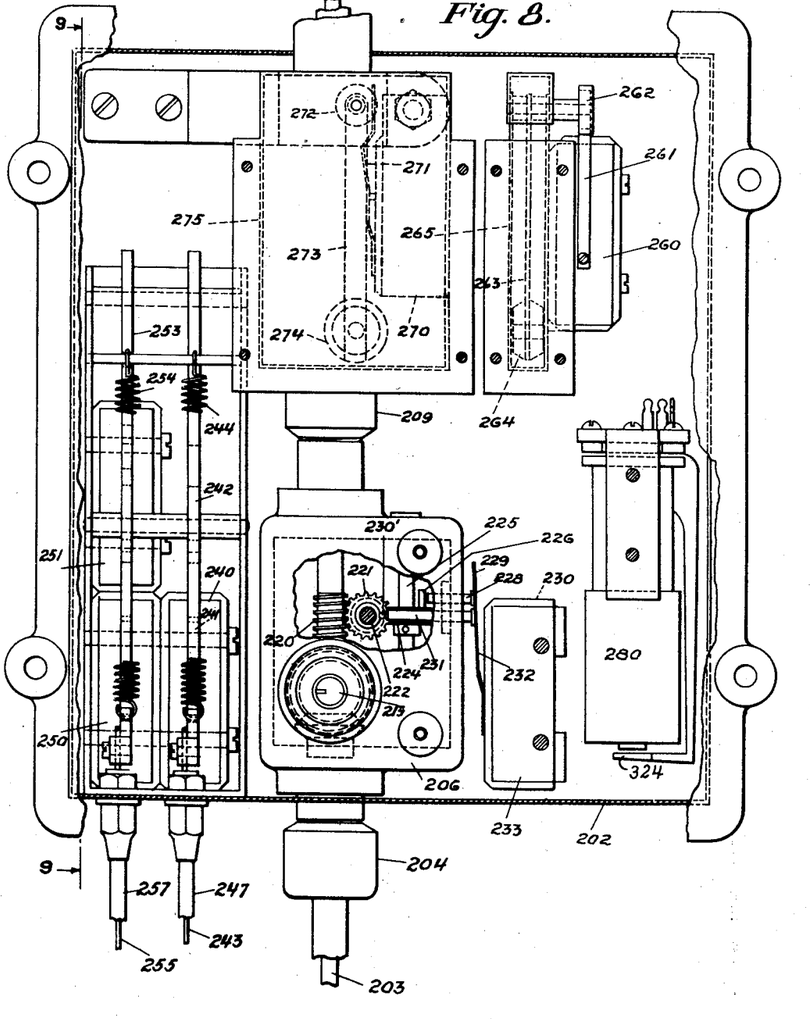
Fig. 8 is a sectional view taken on the line 8—8 of Fig. 7.

For causing the normal exposures at the rate of ten per mile, main shaft 205 is provided with worm 220 meshing with worm gear 221 mounted on cross shaft 222 which also carries worm 223 meshing with worm gear 224 which is carried by the vertical shaft 225. Extending from one side of worm gear 224 is a short pin 226 adapted to engage plunger 228 momentarily once each revolution of worm gear 224, and plunger 228 is adapted to contact with switch operating arm 229 of switch 230 which closes the switch once each revolution of worm gear 224 or about ten times per mile of vehicle travel.

For the actuation of the shutter at more frequent intervals, say one hundred times per mile, or approximately every fifty feet, a pin 230' projects laterally from the side of gear 221, and is adapted to make momentary contact with the inner end of plunger 231 which cooperates with the switch arm 232 of switch 233 to close this switch momentarily.

Also enclosed within the control unit 202 are various other switches including, as illustratively embodied, the clutch operated switch 240, the brake operated switches 250 and 251, the emergency operated switch 260, and the sharp turn switch 270.

Separate switches 250 and 251 are preferably employed so that their actuation may be differently timed, and as illustrated, switch 250 is adapted to be actuated slightly before the actuation of switch 251, as the slide rod 253 is raised.

Clutch operated switch 240 is provided with switch operating arm 241 which engages with the cam surface formed on slide rod 242, and slide rod 242 is moved to switch closing position by disengagement of the clutch through push pull wire 243 normally held under tension by spring 244, one end of the push pull wire 243 being connected to the lower end of bar 242 while the other end is attached to the clutch pedal 12. Likewise, the brake operated switches 250 and 251 provided with similar switch operating arms cooperating with the cam surface of slide rod 253 are adapted to be closed as brake pedal 11 is depressed to apply the brake. Spring 254 is connected to the rod 253 and holds push pull wire 255 in tension between the lower end of slide bar 253 and the brake pedal 11. Push pull wires 243 and 255 are enclosed in their individual sheaths 247 and 257, respectively, which are anchored to the chassis by clamp 246 near the pedals 11, 12, the other end of these sheaths being fitted to the lower wall of casing 206.

For controlling the camera and indicia when the vehicle is turning, and more frequent taking of pictures may be required in order to make a complete record of the course of the vehicle and the incidents occurring therealong, another switch 270 is provided and is closed by centrifugal force developed by the turning of the vehicle in either direction. As embodied, the switch 270 is provided with a switch arm 271 normally resting against a flat on disc 272 which is rigidly connected to and moved by a freely swinging pendulum 273 adapted to swing transversely of the vehicle. Preferably, the pendulum bob 274 is variably positionable along the pendulum so as to vary the amount of centrifugal force necessary for the closing of the switch. In order to prevent fast swinging of the pendulum 273, the pendulum is preferably contained within an oil-tight housing 275 filled with some relatively viscous liquid such as lubricating oil or hydraulic brake fluid which will have the tendency of damping minor vibrational movements of the pendulum, allowing it to respond to a continuous development of centrifugal force in the same direction over a moderate period of time, say one-half to two seconds.

In order to actuate the camera when the deceleration of the vehicle exceeds a predetermined maximum, as in case of a collision with a fixed object or a rough or jolting application of the brakes such as might damage the cargo or cause injury to bus passengers, another switch 260 is provided which is illustratively shown as a double pole, single throw switch to be actuated by switch arm 261, which rests against the flat on cam 262 connected to the freely swinging pendulum 263 having an adjustable bob 264, and likewise immersed in some damping liquid within the housing 265. As the vehicle is suddenly decelerated, the pendulum 263 swings forwardly of the vehicle by inertia, thereby shifting the switch arm 261 to its operative position.

Also contained within the control unit 202 is a relay 280 which is preferably of a relatively slow make and slower break type, and is adapted to close such of the branch circuits as are necessary to permit the periodically operating switches to be rendered effective, at the same time allowing the occasionally operated switch to be rendered effective. That is, this relay permits the pictures to be taken every fifty feet by closing of the switch 230 while the brake is depressed and switches 250 and 251 are also closed and have caused a picture to be taken. The action is similar with respect to the occasional taking of pictures caused by switches 260 and 270.

Control unit 202 is connected with the camera by means of a flexible shaft 210 which is connected to drive speedometer 182 through the bevelled gearing 290, and the sheath surrounding the flexible shaft 210 also serves as a protective covering for the group of conductors 291 which interconnect the control unit 202 and the camera 15.

Figures 11, 12:
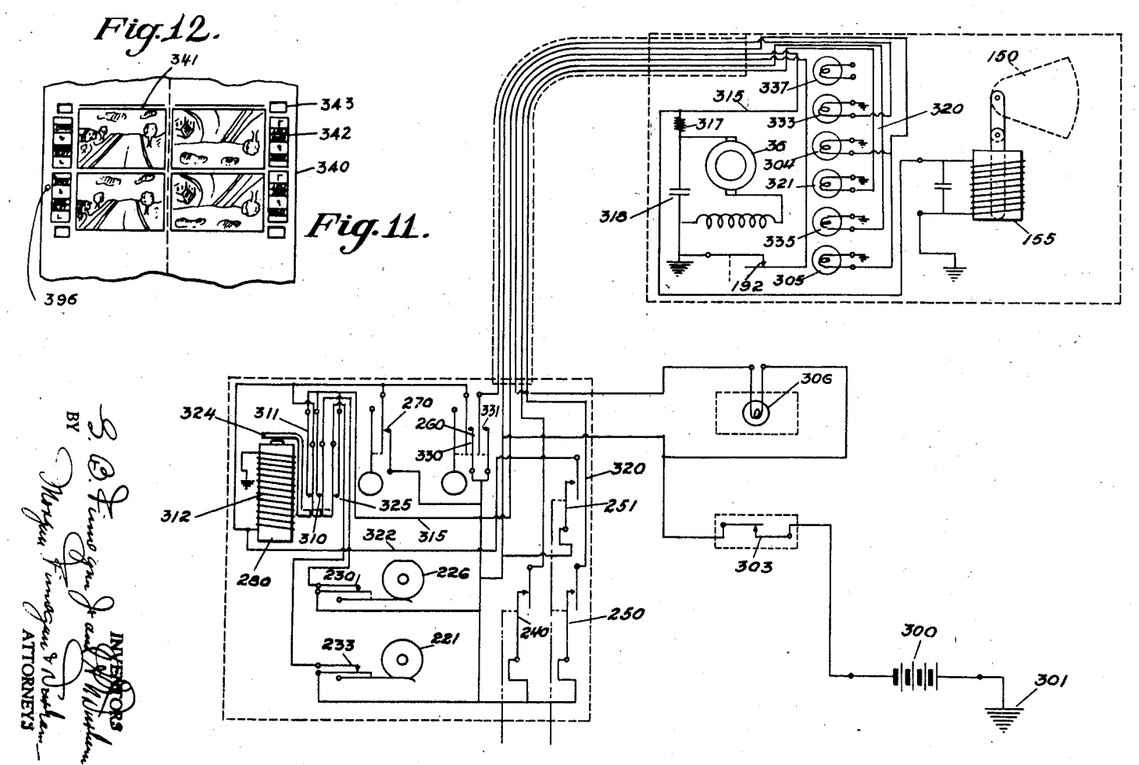
Fig. 11 is a schematic view showing the wiring diagram of the illustrative embodiment shown in the other figures of the drawing.
Fig. 12 is an enlarged view of a picture and indicia as exposed on the film.

Fig. 11 of the drawings is a circuit diagram showing the illustrative manner in which the electrical connections are made between the various parts which have been described in connection with the other figures of the drawings. As embodied, the power is derived from any suitable source such as a storage battery 300 which is grounded to the chassis at 301 and is connected to the recording camera and control apparatus through a master switch 303, which leads to the movable contact of switches 230, 233, 240, 250, 251, 270, as well as both movable contacts of the switch 260. In addition, the current is supplied to the master switch 303 to the lights 304 and 305 for the speedometer and clock, respectively, in the camera casing 15, and is also supplied to one terminal of a pilot or signal light 306, located at some convenient point, such as on the dashboard of the vehicle. Whenever the master switch 303 is closed, current is supplied to lamps 304, 305, and is always available for the switches 230, 233, 240, 250, 251, 260 and 270. Pilot light 306 is normally out but is lit by the closing of switch 192 when the film supply is exhausted.

During the normal operation switch 230 is closed every one-tenth of a mile, causing current to be supplied to the middle contact 310 of relay 280. Contact 310 is normally closed as are the relay contacts 311, and current is supplied through 310 to 311 and thence to the coil 312 of relay 280, as well as to the motor conductor 315 supplying energy to motor 36 and to weather shutter solenoid 155. An inductive resistance 317 is in circuit with the motor, and the windings of the motor are shunted by condenser 318 so that the motor action will be delayed at all times with respect to the shutter 150 as well as with respect to the various lamps illuminating the indicia panel 170.

When the brake is applied, switch 250 is closed and current is supplied through conductor 320 to the brake indicia lamp 321, lighting the lamp so that the corresponding indicia will be registered on the film. Simultaneously, switch 251 is closed and current is supplied through conductor 322 to the coil 312 of relay 280, this connection also supplying current to contacts 311 so that current is also supplied to motor 36 and solenoid 155, again causing the motor to expose the film and feed the film, as the weather shutter 150 is opened. As the coil 312 is energized, relay armature 324 is attracted, breaking the circuit at contacts 310 and 311 after the lapse of a fraction of a second, and making the circuit at contact 325, thereby connecting switch 233 in circuit so that succeeding pictures are taken periodically by rotation of switch actuating gear 221 every one-hundredth of a mile through current supplied from the battery, through switch 233, contact 325, and thence to the motor 36 and solenoid 155. During the fraction of a second required for the attraction of the relay armature 324 prior to the opening of contacts 310, 311, and the closing of contact 325, sufficient amount of time has elapsed for the lighting of the indicia lights and for a full revolution of the shutter 30 driven by the motor 36. Thus, when the brake is applied, the camera is instantly actuated, and continues to take successive pictures at an accelerated rate so long as the brake remains depressed, and this accelerated rate of taking pictures also occurs when the vehicle is turned sharply, when excessive deceleration occurs, or in general, when the vehicle deviates greatly from its normal straight course at a substantially uniform speed.

In case the vehicle is turned sharply, switch 270 is closed, supplying current to coil 312, motor 36 and solenoid 155 in the same manner as with switch 251 (not 250).

When excessive deceleration occurs, switch 260 is closed as to both its poles, and current is supplied through contacts 330 to the relay winding 312, motor 36 and solenoid 155, and current is also supplied through contact 331 to the indicia panel light 333 which illuminates indicia 172.

Disengagement of the clutch closes switch 240 which does not of itself cause the taking of any record pictures, but the closing of this switch merely causes indicia light 335 to be illuminated so that the fact that the clutch was disengaged will be recorded when the taking of a picture occurs for any other reason. Thus, a succession of pictures showing the clutch disengaged, and a fairly high or increasing speed would indicate dangerous coasting down grade.

A spare indicia light 337 is provided which may be illuminated when the gears are in neutral, when the doors of the bus are open, or when any other desired condition occurs.

Fig. 12 shows a typical portion of a record film produced by the illustrated embodiment. The film 340 is shown as standard 16 mm. motion picture film, with each of the record images covering one quarter of a normal frame. The road image is designated as 341, while the series of indicia records are designated 342 and are positioned at the edges of the film and between the film feeding perforations 343. The fogged portion 396 shows that the vehicle was stopped for a considerable period of time between two of the successive exposures. The images at the left hand half of the film are in sequence, and the inverted images at the right hand side of the film represent travel of the vehicle after the magazine has been inverted.

The invention in its broader aspects is not limited to the specific mechanisms shown and described but departures may be made therefrom within the scope of the accompanying claims without departing from the principles of the invention and without sacrificing its chief advantages.

What we claim is:

1. In a camera for recording the operation of motor vehicles, the combination of a lens for making simultaneous exposures of near and distant objects, means for feeding successive areas of sensitized material into exposure position, a mirror positioned in the field of view of the lens, an indicator showing the operation of a vehicle control and included in the field of view of the lens by the mirror, and means operated by actuation of said vehicle control for exposing said indicator and a distant scene simultaneously through said lens.

2. In a camera for recording the operation of a motor vehicle, the combination of means for feeding successive areas of sensitized material into an exposure position, a lens for forming an image of a distant scene on the film, a series of indicia showing the operations of a plurality of the vehicle controls, a mirror in front of the lens and at an edge of the field of view of the lens for reflecting the indicia into the lens and onto the exposure position, and means operated by actuation of at least one of said vehicle controls for exposing the indicia in said series corresponding to said control and simultaneously exposing said distant scene.

3. In a camera for recording the operation of a motor vehicle, the combination of means for feeding successive areas of sensitized material into an exposure position, a lens for forming an image of a distant scene on the film, a series of indicia showing the operations of a plurality of the vehicle controls, a mirror in front of the lens and at an edge of the field of view of the lens for reflecting the indicia into the lens and onto the exposure position, and means operated by actuation of at least one of said vehicle controls for exposing the indicia in said series corresponding to said control and simultaneously exposing said distant scene, said means comprising exposure lights adjacent the respective indicia, said lights being selectively illuminated by operation of the respective vehicle controls relating to the indicia adjacent thereto.

4. In a recording camera, the combination of means for feeding successive areas of film into exposure position, a lens for forming a distant scene image at the exposure position, a plurality of indicia included in the field of view of the lens, shutter means for simultaneously momentarily exposing adjacent parts of the film through the lens to said distant scene and said indicia respectively, and means automatically operated by selected vehicle controls used in driving the vehicle for momentarily illuminating selected indicia simultaneously with said exposures.

GEORGE B. FINNEGAN, JR.
HOBART N. DURHAM.

REFERENCES CITED

The following references are of record in the file of this patent:

UNITED STATES PATENTS

| Number | Name | Date |
| --- | --- | --- |
| 2,323,576 | Sperry | July 6, 1943 |
| 2,278,357 | Madden | Mar. 31, 1942 |
| 349,133 | Anthony et al. | Sept. 14, 1886 |
| 1,810,002 | Arnold | June 16, 1931 |
| 2,325,335 | Meyers | July 27, 1943 |
| 2,005,366 | Gaty | June 18, 1935 |
| 2,148,119 | Grist | Feb. 21, 1939 |
| 1,143,522 | Faber | June 15, 1915 |
| 1,411,689 | Frederick et al. | Apr. 4, 1922 |
| 2,336,081 | Finnegan et al. | Dec. 7, 1943 |
| 1,764,066 | Chamberlin | June 17, 1930 |

FOREIGN PATENTS

| Number | Country | Date |
| --- | --- | --- |
| 795,356 | France | Jan. 6, 1936 |